US006708683B1

(12) United States Patent
Harris

(10) Patent No.: US 6,708,683 B1
(45) Date of Patent: Mar. 23, 2004

(54) SPEAR GUN HAVING SIDE-BY-SIDE SPEARS

(76) Inventor: George P. Harris, P.O. Box 908, Palm Harbor, FL (US) 34682

( * ) Notice: Subject to any disclaimer, the term of this patent is extended or adjusted under 35 U.S.C. 154(b) by 0 days.

(21) Appl. No.: 10/249,706

(22) Filed: May 1, 2003

(51) Int. Cl.[7] .................................................. F41B 3/02
(52) U.S. Cl. ........................ 124/20.3; 124/22; 124/26
(58) Field of Search ................... 124/17, 20.3, 22, 124/26

(56) References Cited

U.S. PATENT DOCUMENTS

| | | | |
|---|---|---|---|
| 3,262,441 A | * | 7/1966 | Senne |
| 3,585,979 A | * | 6/1971 | Hendricks |
| 3,741,190 A | * | 6/1973 | Lopez |
| 3,949,731 A | * | 4/1976 | Caso |
| 4,962,747 A | * | 10/1990 | Biller |
| 5,595,166 A | * | 1/1997 | Schmidt et al. |

* cited by examiner

Primary Examiner—John A. Ricci
(74) Attorney, Agent, or Firm—Ronald E. Smith; Smith & Hopen, P.A.

(57) ABSTRACT

A spear gun includes two spears disposed in laterally spaced relation to one another. A separate trigger is dedicated to each spear. Each spear is received within the lumen of a forward spear guide tube and a rearward spear guide tube. Each forward spear guide tube includes a laterally extending post to which is attached the forward end of an elastomeric member. The rearward end of each elastomeric member engages an inclined notch formed in the trailing end of its associated spear. The trailing end of each spear is notched and the notch is engaged by a mating notch formed in a pivotally mounted detent plate. Pulling a trigger pivots the detent plate so that the notches disengage and the bias on the elastomeric member unloads to propel the spear forwardly. A safety latch prevents pulling of the trigger by preventing pivoting of the detent plate.

5 Claims, 3 Drawing Sheets

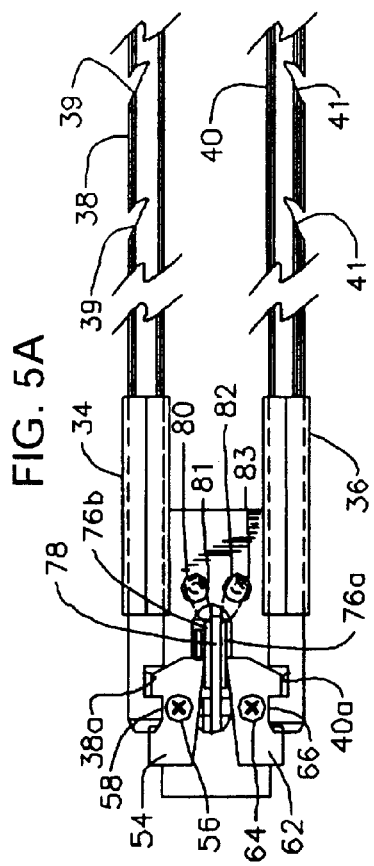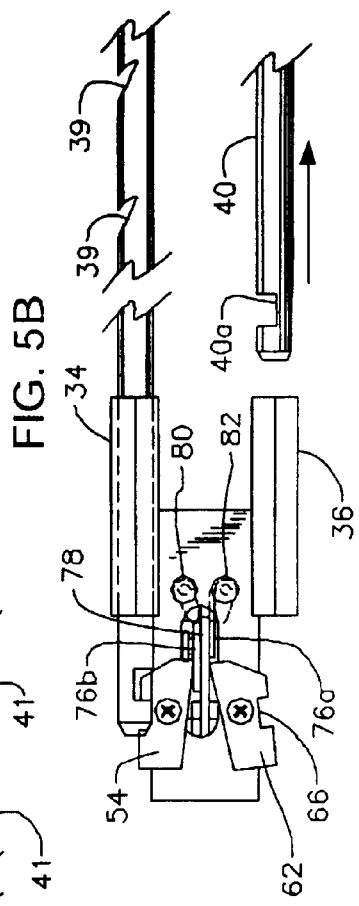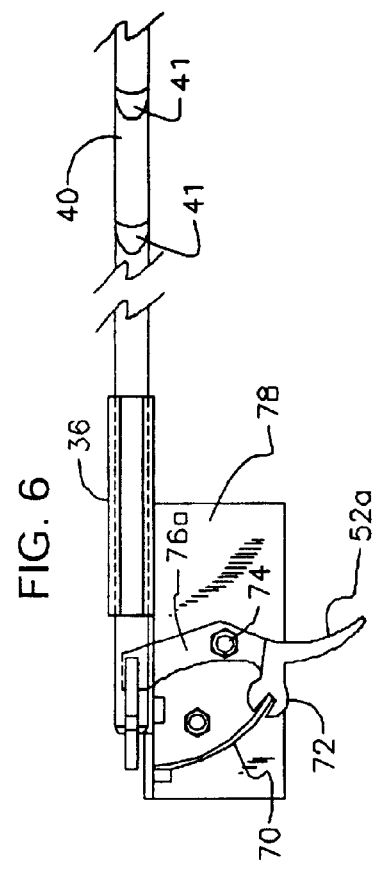

SPEAR GUN HAVING SIDE-BY-SIDE SPEARS

BACKGROUND OF INVENTION

1. Field of the Invention

This invention relates, generally, to spear guns of the type used in fishing. More particularly, it relates to a spear gun having a pair of spears disposed in lateral relation to one another.

2. Description of the Prior Art

The simplest spear gun includes a single spear but more advanced spear guns include two spears, mounted in an over-under arrangement. An example of such a spear gun is disclosed in U.S. Pat. No. 3,741,190 to Lopez. Two spears double the chances of a successful hunt. As depicted in Lopez, in an over-under spear gun, a first trigger is positioned directly in front of a second trigger. This can make finding the second trigger difficult when the user is in a hurry due to a missed or otherwise inadequate first shot.

A spear gun is an inherently dangerous instrument. However, the known spear guns either lack safety locks or have inadequate safety locks.

Moreover, the known spear guns are quite heavy and mechanically complex. Thus they require substantial maintenance.

Therefore, there is a need for a light-in-weight, simple yet elegant-in-design, durable spear gun construction that requires little maintenance, includes safety locks, and provides two spears, each of which has an easily accessible trigger.

However, in view of the prior art considered as a whole at the time the present invention was made, it was not obvious to those of ordinary skill in the pertinent art how the art could be advanced.

SUMMARY OF INVENTION

The long-standing but heretofore unfulfilled need for an improved spear gun is now met by a new, useful, and nonobvious invention. The novel spear gun of this invention includes an elongate barrel having a first forward spear guide tube mounted to a leading end thereof. A second forward spear guide tube is mounted to a leading end of the elongate barrel in laterally spaced apart relation to the first forward spear guide tube. A first rearward spear guide tube is mounted to a trailing end of the elongate barrel in axial alignment with the first forward spear guide tube and a second rearward spear guide tube is mounted to a trailing end of the elongate barrel in laterally spaced apart relation to the first rearward spear guide tube and in axial alignment with the second forward spear guide tube.

A first spear is adapted to have a trailing end thereof slidingly received within a lumen of the first rearward spear guide tube and a leading end thereof slidingly received within a lumen of the first forward spear guide tube. A second spear is adapted to have a trailing end thereof slidingly received within a lumen of the second rearward spear guide tube and a leading end thereof slidingly received within a lumen of the second forward spear guide tube.

A first elongate elastomeric member has a leading end adapted to be releasably attached to a leading end of the spear gun and a trailing end adapted to be releasably attached to an inclined notch formed in the first spear near a trailing end thereof. A second elongate elastomeric member has a leading end adapted to be releasably attached to a leading end of the spear gun and a trailing end adapted to be releasably attached to an inclined notch formed in the second spear near a trailing end thereof.

A first trigger is adapted to launch the first spear and a second trigger is adapted to launch the second spear. A first detent means has a first position that releasably engages a trailing end of the first spear and a second position that is unengaged from the trailing end of the first spear. A second detent means has a first position that releasably engages a trailing end of the second spear and a second position that is unengaged from the trailing end of the second spear.

A first laterally extending mounting post is secured to the first forward spear guide tube and a second laterally extending mounting post is secured to the second forward spear guide tube. The leading end of the first elongate elastomeric member is releasably attached to the first laterally extending mounting post and the leading end of the second elongate elastomeric member is releasably attached to the second laterally extending mounting post.

The novel spear gun includes an elongate barrel against which the spears are disposed in laterally spaced apart relation to one another. A handle has a forward end secured to a trailing end of the elongate barrel. An arm support has a leading end secured to a trailing end of the handle and the arm support is parallel to the elongate barrel. The handle is disposed at an angle relative to the elongate barrel that is between about ninety degrees to about one hundred thirty five degrees. The elongate barrel, handle, and arm support are disposed in coplanar relation to one another and are positioned in a common substantially vertical plane when the spear gun is used.

A cavity is formed in the trailing end of the elongate barrel and a vertically disposed base plate is positioned within the cavity in substantial coincidence with a longitudinal axis of symmetry of the elongate barrel. The first trigger is mounted for pivotal movement about a first pivot point on a first side of the base plate and the second trigger is mounted for pivotal movement about a second pivot point on a second side of the base plate. The first trigger includes a lower finger-engageable part that extends downwardly from the cavity and that has a free end positioned below the trailing end of the elongate barrel. The second trigger includes a lower finger-engageable part that extends downwardly from the cavity and that has a free end positioned below the trailing end of the elongate barrel. The first trigger has a flat, rigid arm extending upwardly from the first pivot point. The flat, rigid arm is disposed in overlying relation to the first side of the base plate. The second trigger has a flat, rigid arm extending upwardly from the second pivot point. The flat, rigid arm is disposed in overlying relation to the second side of the base plate.

The first detent means is pivotally mounted. A first biasing means is provided for urging the first detent means to pivot toward the base plate. The flat, rigid arm of the first trigger is disposed between the base plate and the first detent means and prevents full pivoting of the first detent means when the first trigger is in repose. The second detent means is also pivotally mounted. A second biasing means is provided for urging the second detent means to pivot toward the base plate. The flat, rigid arm of the second trigger is disposed between the base plate and the second detent means and prevents full pivoting of the second detent means when the second trigger is in repose.

A straight notch is formed in the trailing end of the first spear. A mating straight notch is also formed in the first detent means. The notch formed in the first spear and the mating notch formed in the first detent means are disposed in engaged relation to one another when the first trigger is in repose. The notch formed in the first spear and the mating notch formed in the first detent means are disposed in disengaged relation to one another when the first trigger is pulled. The pulling of the first trigger causes the first trigger to pivot about the first pivot point so that the first, flat rigid arm rotates away from the base plate. The first biasing means urges the first detent mean to pivot into its second, fully pivoted position where it bears against the base plate. The first spear is propelled from the spear gun by the first elongate elastomeric member when the respective notches are disengaged from one another.

The straight notch formed in the second spear and the mating notch formed in the second detent means are disposed in disengaged relation to one another when the second trigger is pulled. The pulling of the second trigger causes the second trigger to pivot about the second pivot point so that the second, flat rigid arm rotates away from the base plate. The second biasing means urges the second detent mean to pivot into its second, fully pivoted position where it bears against the base plate. The second spear is propelled from the spear gun by the second elongate elastomeric member when the respective notches are disengaged from one another.

An important object of this invention is to provide a spear gun having spears disposed in lateral relation to one another.

An object closely related to the foregoing object is to provide a spear gun having two triggers, neither of which obstructs the other.

Yet another important object is to provide a spear gun that is safe to operate.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF DRAWINGS

For a fuller understanding of the nature and objects of the invention, reference should be made to the following detailed description, taken in connection with the accompanying drawings, in which:

FIG. 5A is a top plan view of the firing assembly when both spears are ready to be fired;

FIG. 5B is a top plan view of the firing assembly when one spear has been fired and the second spear remains ready to be fired; and FIG. 6 is a side elevational view of the firing assembly.

DETAILED DESCRIPTION

Figure 1:
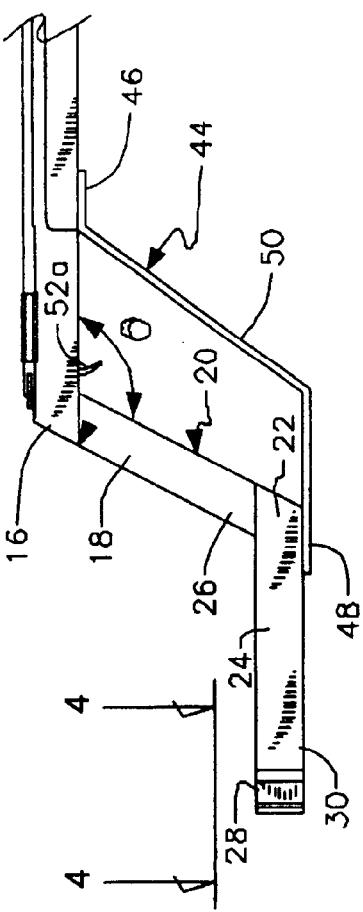
FIG. 1 is a side elevational, partially broken away view of the novel spear gun.
Figure 1:
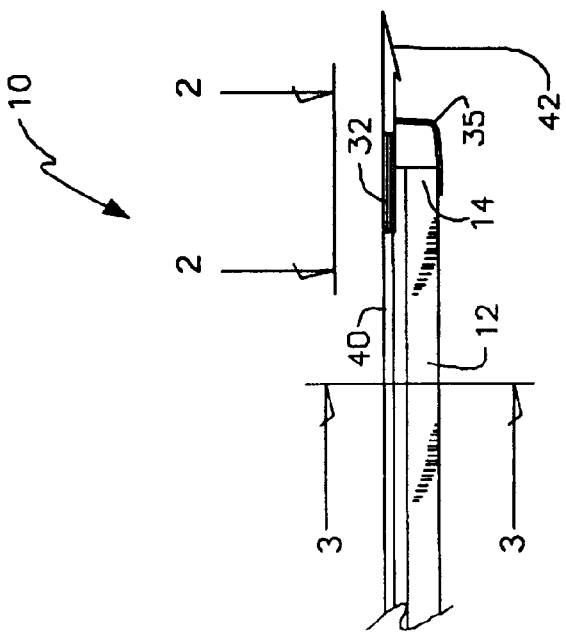

Referring to FIG. 1, it will there be seen that the reference numeral 10 denotes an illustrative embodiment of the present invention as a whole.

Spear gun 10 includes an elongate solid barrel 12 having a leading end 14 and a trailing end 16. Leading end 18 of handle 20 is fixedly secured to trailing end 16 of barrel 12. Leading end 22 of arm support 24 is secured to trailing end 26 of handle 20, and cradle 28 is secured to the trailing end 30 of arm support 24.

Barrel 12 and arm support 24 are interconnected to one another by handle 20 and are disposed in parallel relation to one another.

Angle Î□s about one hundred ten degrees (110Â°). Any angle from about ninety degrees (90Â°) to one hundred thirty five degrees (135Â°) should be acceptable. The angular range is not critical to this invention and a handle disposed at an angle outside the range disclosed herein would still function and fall within the scope of this invention. When a user grips handle 20, the forearm of the user rests atop the trailing end of arm support 24.

Forward spear guide tubes 30 and 32 (FIG. 2) are secured to the leading end of barrel 12 on opposite sides thereof and rearward spear guide tubes 34, 36 (FIGS. 5A and 5B) are secured to the trailing end of barrel 12 on opposite sides thereof. More particularly, first forward spear guide tube 30 is in axial alignment with a first rearward spear guide tube 34 and second forward spear guide tube 32 is in axial alignment with second rearward spear guide tube36. Spear guide tube plate 13 (FIG. 2) overlies the top of barrel 12, is secured thereto with screws 13a, 13b or other suitable fastening means, and interconnects forward spear guide tubes 30, 32 to one another. A recess is formed in the leading end of barrel 12 to accommodate the thickness of plate 13 so that said plate is flush with the top of said barrel.

Figure 3:
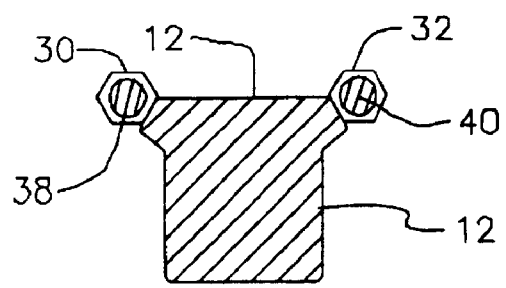
FIG. 3 is a transverse sectional view taken along line 3—3 on FIG. 1.
Figure 4:
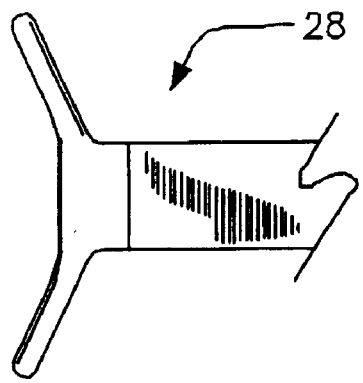
FIG. 4 is a top plan view taken along line 4—4 in FIG. 1.

The hexagonal outer structure of spear guide tubes 30, 32, as depicted in FIG. 3, is ornamental. Each forward guide tube has a cylindrical lumen that slidingly receives the leading end of a spear 38, 40, and each rearward guide tube has a cylindrical lumen that that slidingly receives the trailing end of a spear. This ensures that each spear will travel in a straight line in a direction determined by the position of barrel 12 at the moment of trigger activation. The leading end of each spear is barbed as at 42 in FIG. 1.

Trigger guard 44 (FIG. 1) has a leading end 46 secured to an underside of barrel 12, a trailing end 48 secured to an underside of arm support 24, and a medial part 50 disposed in generally parallel, spaced apart relation to handle 20.

Triggers 52a, 52b depend from a hollow cavity formed in the trailing end of barrel 12.

Figure 2:
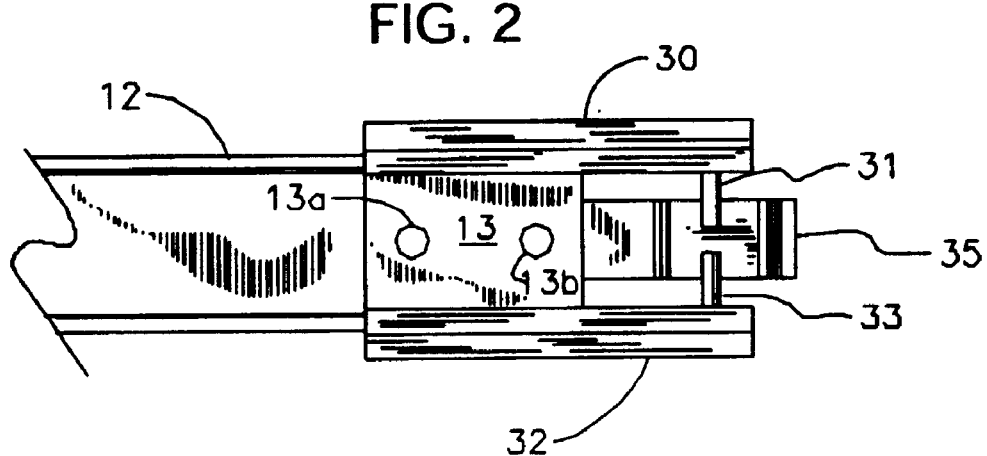
FIG. 2 is a top plan view taken along line 2—2 in FIG. 1.

The firing mechanism is best depicted in FIGS. 2, 5A, 5B, and 6. As depicted in FIG. 2, transversely disposed post 31 is secured to forward spear guide tube 30 and transversely disposed post 33 is secured to forward spear guide tube 32. The forward end of a first elongate elastomeric member, not shown, is secured to post 31 and the forward end of a second elongate elastomeric member, not shown, is secured to post 33. Shield 35, preferably of metallic construction, has a trailing end secured to the underside of barrel 12 as depicted in FIG. 1 and a leading end that extends in leading relation to said posts. As its name implies, shield 35 protects the leading ends of said elongate elastomeric members from being abraded or knocked off of their respective posts 31, 33.

As indicated in FIGS. 5A, 5B, and 6, straight notch 38a is formed in the trailing end of spear 38 and straight notch 40a is formed in the trailing end of spear 40. Horizontally disposed detent plate 54 is pivotally mounted about pivot point 56 and said detent plate 54 has a notch 58 formed in its outboard side. The trailing edge of notch 38a formed in the trailing end of spear 38 engages the leading end of notch 58 when spear 38 is in position for firing. When a first elongate elastomeric member having a leading end wrapped about post 31 and a trailing end positioned within inclined notch 39, the engagement of the trailing edge of notch 38a and the leading edge of notch 58 prevents said spear from being launched by the bias provided by said elongate elastomeric member. A torsion spring, not shown, urges detent plate 54 to rotate in a clockwise direction relative to pivot point 56. If such clockwise rotation were to occur, the respective notches formed in detent plate 54 and spear 38 would disengage from one another and said spear would be launched.

In the same way, horizontally disposed detent plate 62 is pivotally mounted about pivot point 64 and said detent plate 62 has a straight notch 66 formed in its outboard side. The trailing edge of straight notch 40a formed in the trailing end of spear 40 engages the leading end of notch 66 when spear 40 is in position for firing. When a second elongate elastomeric member having a leading end wrapped about post 33 has a trailing end positioned within inclined notch 41, the engagement of the trailing edge of straight notch 40a and the leading edge of straight notch 66 prevents said spear from being launched by the bias provided by said elongate elastomeric member. A torsion spring, not shown, urges detent plate 62 to rotate in a counterclockwise direction relative to pivot point 64. If such counterclockwise rotation were to occur, the respective notches formed in detent plate 62 and spear 40 would disengage from one another and said spear would be launched.

The structure and operation of trigger 52a is best understood in connection with FIG. 6, it being understood that unillustrated trigger 52b has the same structure and operation but is not depicted in FIG. 6 because it is directly behind trigger 52a. Both triggers are positioned in the cavity formed within elongate barrel 12 near its trailing end. The cavity is oblong in configuration and can be seen in FIGS. 5A and 5B but is unnumbered to avoid cluttering of the drawings. A vertically disposed base plate 78 is positioned in said cavity in substantial coincidence with a longitudinal axis of symmetry of barrel 12 as perhaps best understood in connection with FIGS. 5A and 5B. The triggers are pivotally mounted to said base plate 78 on opposite sides thereof, as more fully set forth below.

Leaf spring 70 (FIG. 6) engages slotted base 72 of trigger 52a and biases said trigger into its position of repose. Thus, trigger 52a cannot be pulled until a force is applied thereto that exceeds the bias provided by leaf spring 70a. A safety means, disclosed below, when set prevents pulling of said trigger even when a force exceeds said bias.

Trigger 52a is mounted for pivotal rotation about pivot point 74. Rigid arm 76a of trigger 52a is on the opposite side of pivot point 74 relative to trigger 52a so that rearward motion of trigger 52a causes simultaneous forward motion of rigid arm 76a. More particularly, as depicted in FIG. 6, trigger 52a moves clockwise with respect to pivot point 74 when pulled by a user, and rigid arm 76a moves clockwise as well.

Rigid arm 76a when in repose is positioned between vertically disposed base plate 78 and horizontally disposed detent plate 62 as perhaps best understood in connection with FIG. 5A. Accordingly, when rigid arm 76a moves in a forward, clockwise direction in said vertical plane, it clears the leading end of detent plate 62 and said detent plate 62 rotates in a counterclockwise direction in said horizontal plane under the bias of the aforementioned torsion spring until it encounters said base plate 78 as depicted in FIG. 5B. Such counterclockwise rotation causes disengagement of straight notches 40a and 66 and spear 40 is launched as perhaps best understood by comparing FIGS. 5A and 5B.

Similarly, trigger 52b, not shown, is also mounted for pivotal rotation about pivot point 74. Rigid arm 76b (FIGS. 5A and 5B) of trigger 52b is on the opposite side of pivot point 74 so that rearward motion of trigger 52b causes simultaneous forward motion of rigid arm 76b. More particularly, trigger 52b moves clockwise with respect to pivot point 74 when pulled by a user, and rigid arm 76b moves clockwise as well.

Rigid arm 76b when in repose is positioned between vertically disposed base plate 78 and horizontally detent plate 54 (FIG. 5A). Accordingly, when rigid arm 76b moves in a forward, clockwise direction in a vertical plane, it clears the leading end of detent plate 54 and said detent plate 54 rotates in a clockwise direction in a horizontal plane under the bias of the aforementioned torsion spring until it encounters said base plate 78. Such clockwise rotation causes disengagement of straight notches 38a and 58 and spear 38 is launched.

A safety mechanism is provided to avoid an unintentional launching of either spear. In FIG. 5A, the safety lock for spear 38 is denoted 80 and the safety lock for spear 40 is denoted 82. Safety lock 80 is mounted for pivotal rotation about pivot point 81 and safety lock 82 is mounted for pivotal rotation about pivot point 83. Both safety locks are manually operated. When the respective free ends of said safety locks are turned inwardly toward one another as depicted in FIG. 5A, said free ends are positioned in abutting relation to the leading edges of rigid arms 76b and 76a, respectively. Thus, neither trigger 52a nor 52b can be pulled, even if a force that greatly exceeds the bias of leaf spring 70 is applied. Safety lock 80 must be rotated in a clockwise direction to move out of obstructing relation to rigid arm 76b and safety lock 82 must be rotated in a counterclockwise direction to move out of obstructing relation to rigid arm 76a. In FIG. 5B, safety lock 80 is unrotated and spear 38 cannot be released. Safety lock 82 has been rotated, trigger 52a has been pulled, rigid arm 76a has moved forwardly a distance sufficient to clear the leading edge of detent plate 62, and said detent plate 62 has rotated in a counterclockwise direction about pivot point 64, thereby causing the disengagement of straight notch 40a from straight notch 66 and spear 40 has been released and propelled forwardly under the bias of its associated elongate elastomeric member.

Barrel 12, handle 20, and arm support 24 are preferably formed of wood although such material is not critical. To apply the elongate elastomeric members, spear gun 10 is held in a generally vertical direction while the user is seated. Cradle 28 is placed atop a thigh to facilitate the pulling of the trailing end of each rubber band to an inclined notch formed near the trailing end of its associated spear. More than one inclined riotch is formed in each spear to enable a user to adjust the power of the elastomeric members. Safety locks 80 and 82 are in their respective locked positions at all times and are released only when the user in is the water and has aimed the spear gun at a fish and no other person is on the opposite side of said fish.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,
What is claimed is:

1. A spear gun, comprising:
    an elongate barrel;
    a first forward spear guide tube mounted to a leading end of said elongate barrel;
    a second forward spear guide tube mounted to a leading end of said elongate barrel in laterally spaced apart relation to said first forward spear guide tube;
    a first rearward spear guide tube mounted to a trailing end of said elongate barrel in axial alignment with said first forward spear guide tube;
    a second rearward spear guide tube mounted to a trailing end of said elongate barrel in laterally spaced apart relation to said first rearward spear guide tube and in axial alignment with said second forward spear guide tube;

a first spear adapted to have a trailing end thereof slidingly received within a lumen of said first rearward spear guide tube and a leading end thereof slidingly received within a lumen of said first forward spear guide tube;

a second spear adapted to have a trailing end thereof slidingly received within a lumen of said second rearward spear guide tube and a leading end thereof slidingly received within a lumen of said second forward spear guide tube;

a first elongate elastomeric member having a leading end adapted to be releasably attached to a leading end of said spear gun and a trailing end adapted to be releasably attached to said first spear near a trailing end thereof;

a second elongate elastomeric member having a leading end adapted to be releasably attached to a leading end of said spear gun and a trailing end adapted to be releasably attached to said second spear near a trailing end thereof;

a first trigger adapted to launch said first spear;

a second trigger adapted to launch said second spear;

a first detent means having a first position that releasably engages a trailing end of said first spear and a second position that is unengaged from said trailing end of said first spear; and a second detent means having a first position that releasably engages a trailing end of said second spear and a second position that is unengaged from said trailing end of said first spear.

2. The spear gun of claim 1, comprising:

a first laterally extending mounting post secured to said first forward spear guide tube;

a second laterally extending mounting post secured to said second forward spear guide tube;

said first elongate elastomeric member being releasably attached to said first laterally extending mounting post; and said second elongate elastomeric member being releasably attached to said second laterally extending mounting post.

3. The spear gun of claim 1, further comprising:

a handle having a forward end secured to a trailing end of said elongate barrel;

an arm support having a leading end secured to a trailing end of said handle;

said arm support being parallel to said elongate barrel;

said handle being disposed at an angle relative to said elongate barrel that is between about ninety degrees to about one hundred thirty five degrees; and said elongate barrel, handle, and arm support being disposed in coplanar relation to one another and being positioned in a common substantially vertical plane when said spear gun is used.

4. The spear gun of claim 1, further comprising:

a cavity formed in said trailing end of said elongate barrel;

a vertically disposed base plate positioned within said cavity in substantial coincidence with a longitudinal axis of symmetry of said elongate barrel;

said first trigger mounted for pivotal movement about a first pivot point on a first side of said base plate;

said second trigger mounted for pivotal movement about a second pivot point on a second side of said base plate;

said first trigger including a lower finger-engageable part that extends downwardly from said cavity and that has a free end positioned below said trailing end of said elongate barrel;

said second trigger including a lower finger-engageable part that extends downwardly from said cavity and that has a free end positioned below said trailing end of said elongate barrel;

said first trigger having a flat, rigid arm extending upwardly from said first pivot point, said flat, rigid arm disposed in overlying relation to said first side of said base plate;

said second trigger having a flat, rigid arm extending upwardly from said second pivot point, said flat, rigid arm disposed in overlying relation to said second side of said base plate;

said first detent means being pivotally mounted;

first biasing means for urging said first detent means to pivot toward said base plate, said flat, rigid arm of said first trigger being disposed between said base plate and said first detent means and preventing full pivoting of said first detent means when said first trigger is in repose;

said second detent means being pivotally mounted; and second biasing means for urging said second detent means to pivot toward said base plate, said flat, rigid arm of said second trigger being disposed between said base plate and said second detent means and preventing full pivoting of said second detent means when said second trigger is in repose.

5. The spear gun of claim 4, further comprising:

a notch formed in said trailing end of said first spear;

a notch formed in said first detent means;

said notch formed in said first spear and said notch formed in said first detent means disposed in engaged relation to one another when said first trigger is in repose;

said notch formed in said first spear and said notch formed in said first detent means being disposed in disengaged relation to one another when said first trigger is pulled, said pulling of said first trigger causing said first trigger to pivot about said first pivot point so that said first, flat rigid arm rotates away from said base plate, said first biasing means urging said first detent mean to pivot into its second, fully pivoted position where it bears against said base plate, said first spear being propelled from said spear gun by said first elongate elastomeric member when said respective notches are disengaged from one another;

said notch formed in said second spear and said notch formed in said second detent means being disposed in disengaged relation to one another when said second trigger is pulled, said pulling of said second trigger causing said second trigger to pivot about said second pivot point so that said second, flat rigid arm rotates away from said base plate, said second biasing means urging said second detent mean to pivot into its second, fully pivoted position where it bears against said base plate, said second spear being propelled from said spear gun by said second elongate elastomeric member when said respective notches are disengaged from one another.

* * * * *